(12) United States Patent
Brooks et al.

(10) Patent No.: US 6,285,571 B1
(45) Date of Patent: Sep. 4, 2001

(54) METHOD AND APPARATUS FOR AN EFFICIENT MULTIPHASE SWITCHING REGULATOR

(75) Inventors: Steven W. Brooks, Pomona; Louis Joseph Maggiolino, Rancho Palos Verdes, both of CA (US)

(73) Assignee: Linfinity Microelectronics, Irvine, CA (US)

( * ) Notice: Subject to any disclaimer, the term of this patent is extended or adjusted under 35 U.S.C. 154(b) by 0 days.

(21) Appl. No.: 09/544,770

(22) Filed: Apr. 7, 2000

Related U.S. Application Data
(60) Provisional application No. 60/186,805, filed on Mar. 3, 2000.

(51) Int. Cl.7 .................................. H02M 7/23; G05F 1/59
(52) U.S. Cl. .................................. 363/65; 363/72; 323/272
(58) Field of Search .................................. 363/65, 67, 68, 363/69, 70, 71, 72; 323/268, 271, 272

(56) References Cited

U.S. PATENT DOCUMENTS

| | | | |
|---|---|---|---|
| 4,194,147 | 3/1980 | Payme et al. | 363/65 |
| 4,257,090 | 3/1981 | Kröger et al. | 363/65 |
| 4,276,590 | 6/1981 | Hansel et al. | 363/71 |
| 4,359,679 | * 11/1982 | Regan | 323/272 |
| 4,425,613 | 1/1984 | Shelly | 363/26 |
| 4,618,779 | 10/1986 | Wiscombe | 307/60 |
| 4,635,178 | 1/1987 | Greenhaigh | 363/65 |
| 4,663,570 | 5/1987 | Luchaco et al. | 315/219 |
| 4,698,738 | 10/1987 | Miller et al. | 363/65 |
| 4,717,833 | 1/1988 | Small | 363/71 X |
| 4,724,374 | 2/1988 | Beg | 323/272 |
| 4,729,086 | 3/1988 | Lethellier | 363/65 |
| 4,734,844 | 3/1988 | Rhoads | 363/72 |
| 4,825,144 | 4/1989 | Alberkrack et al. | 363/71 X |
| 4,924,170 | 5/1990 | Henze | 363/71 X |
| 5,036,452 | 7/1991 | Loftus | 363/71 |
| 5,057,719 | 10/1991 | Niedra | 307/570 |
| 5,157,269 | 10/1992 | Jordan et al. | 307/59 |
| 5,164,890 | 11/1992 | Nakagawa et al. | 363/65 |
| 5,200,643 | 4/1993 | Brown | 307/53 |
| 5,266,838 | 11/1993 | Gerner | 363/65 X |
| 5,285,148 | 2/1994 | Uhlenhoff | 323/272 |
| 5,351,180 | 9/1994 | Brennen et al. | 363/71 |
| 5,428,523 | 6/1995 | McDonnal | 363/71 |
| 5,546,298 | 8/1996 | Rohner | 363/71 |
| 5,546,299 | 8/1996 | Lenz | 363/71 |
| 5,568,044 | 10/1996 | Bittner | 323/272 |
| 5,602,464 | 2/1997 | Linkowsky et al. | 323/272 |
| 5,724,237 | 3/1998 | Hunter | 363/65 |
| 5,751,150 | * 5/1998 | Rippel et al. | 363/72 X |
| 5,834,925 | 11/1998 | Chesavage | 323/272 |
| 5,883,797 | 3/1999 | Amaro et al. | 363/65 |
| 5,945,815 | 8/1999 | Elliott | 323/269 |

* cited by examiner

Primary Examiner—Jessica Han
(74) Attorney, Agent, or Firm—Knobbe, Martens, Olson & Bear, LLP (57) ABSTRACT

An efficient multiphase switching regulator uses sensed voltages to achieve accurate forced current sharing and programmable current sharing. The voltage waveforms at the input of respective inductors are low-pass filtered to produce sensed voltages which are proportional to the duty cycles of the respective voltage waveforms. The sensed voltages are compared. The comparisons are used to adjust PWM circuits which control the duty cycles of the voltage waveforms of the respective inductors. Substantially identical sensed voltages at the inputs of identical inductors result in substantially identical output currents from respective inductors. The ratio of the output currents from respective inductors can be changed by adjusting a variable resistor that changes the fractions of respective sensed voltages being compared.

8 Claims, 10 Drawing Sheets

METHOD AND APPARATUS FOR AN EFFICIENT MULTIPHASE SWITCHING REGULATOR

This application is a continuation of a provisional application No. 60/186,805 filed Mar. 3, 2000.

BACKGROUND OF THE INVENTION

1. Field of the Invention

This present invention relates generally to a power conversion circuit and more particularly to a multiphase switching regulator.

2. Description of the Related Art

A power conversion circuit (e.g., switching regulator) accepts a Direct Current (DC) voltage source at one level and outputs a desired DC voltage at another level. The switching regulator includes one or more switches which can be implemented by Metal-Oxide-Semiconductor-Field-Effect-Transistors (MOSFETs). The switches alternate between connecting and disconnecting the voltage source to circuits that drive the output. The duty cycle of the switching determines the output voltage. The switching is typically controlled by a Pulse-Width Modulation (PWM) circuit.

Switching regulators are useful in high current applications, such as high power microprocessors, Pentium II and Pentium III based applications, notebook computers, desktop computers, network servers, large memory arrays, workstations and DC high-power distribution systems, which typically require 15 to 200 amperes. The switching regulator can have multiple parallel channels to process one or more of the voltage sources to drive a common output. Each channel is substantially identical and includes an inductor. The input terminal of the inductor is switched between the voltage source and ground.

In a multiphase switching regulator, an exemplary PWM circuit provides a variable duty cycle signal to control the switching for each channel. The PWM signals are synchronous with different phases for each channel, thereby allowing each channel to be switched on at a different time. The multiple phases increase the output ripple frequency above the fundamental channel switching frequency and reduce the input ripple current, thereby significantly reducing input and output capacitors which are large and expensive. Stress and heat on the components are also reduced because the output current is spread among the multiple channels.

The DC current through each inductor is proportional to the duty cycle of its PWM signal and the value of its voltage source. Each inductor has a current limit. Typically, more PWM circuits are used when more output current is desired. The output terminals of all the inductors are electrically connected to provide a single output of the power conversion circuit.

The output terminals of all the inductors are tied together and therefore have identical voltages. The input terminal of each inductor has a rectangular wave voltage signal, which is derived from the voltage source and ground. The duty cycles of the rectangular wave voltage signals of respective channels are affected by variations in the respective PWM circuits and switches (e.g., design tolerances, offsets, and timing variations). A slight difference in the duty cycle can produce a significant difference in the DC current through the inductor in each channel.

High efficiency power conversion circuits typically use inductors with low core loss (e.g., ferrite inductors). When the peak design current is exceeded (i.e., saturation), the inductance of ferrite core material collapses abruptly which results in an abrupt increase in inductor ripple current and output voltage ripple. Thus, it is important to keep the inductor core from saturating.

Forced current sharing is a concept that all channels contribute substantially identical currents to the output. Forced current sharing prevents an inductor in one of the channels from saturating. Prior art systems sense the current in each channel and adjust the respective duty cycles to produce the same current for each channel. Current sensing decreases the efficiency of the power conversion circuit because power is dissipated by a sensing resistor. Further, current sensing requires an undesirable ripple voltage across the sensing resistor in order to work properly. Alternatively, other prior art systems employed costly precision design and trimming in an attempt to achieve accurate current sharing without sensing resistors. Typically, phase current mismatches are on the order of 30 percent or greater when employing precision duty cycle matched converters, necessitating the use of significantly higher current MOSFETs and inductors.

SUMMARY OF THE INVENTION

The present invention solves these and other problems by providing a power efficient and reduced cost multiphase switching regulator wherein sensed voltages are provided to accurately control the output currents of respective channels. The sensed voltages are derived from respective voltage waveforms applied to inputs of respective inductors in respective channels. A respective PWM circuit controls a switch coupled to the input of each inductor. The PWM circuit alternately causes the switch to connect the input of the inductor to a voltage source and ground. As a result, the voltage waveform at the input of each inductor is a rectangular wave voltage with an amplitude approximately equal to the voltage source and a duty cycle controlled by the PWM circuit. The sensed voltage is proportional to an average value of the voltage waveform at the input of the inductor and can be derived by low-pass filtering the input of the inductor. The sensed voltage is a DC value of the voltage waveform at the input of the inductor.

In one embodiment, the sensed voltages are used to achieve forced current sharing. The output currents of respective channels are adjusted to be substantially identical by adjusting the PWM circuits of respective channels accordingly to achieve substantially identical sensed voltages in all the channels.

In one embodiment, the same voltage source is supplied to each channel of the multiphase switching voltage regulator. The sensed voltage is proportional to the duty cycle of the voltage waveform at the input of the inductor, which is the same as the duty cycle of the PWM signal being applied to the switch. Identical sensed voltages indicate that the duty cycles of the voltage waveforms at the inputs of respective inductors are substantially identical. Identical duty cycles applied to identical inductors result in identical output currents.

In an alternate embodiment, two or more voltage sources are supplied to the multiphase switching voltage regulator to drive a common output. For example, a +5VDC voltage and a +12VDC voltage can supply current to a common load. The different voltage sources are processed by different channels of the multiphase switching voltage regulator. Each voltage source is coupled to a different inductor input. The outputs of the inductors are electrically connected together to provide the common output.

Identical sensed voltages achieve forced current sharing between two or more voltage sources. In the case of two or more voltage sources, identical sensed voltages do not necessarily indicate identical duty cycles for the voltage waveforms at the inputs of respective inductors. The sensed voltage is also proportional to the value of the voltage source. For example, the duty cycle for the channel with the +12VDC voltage source is less than the duty cycle for the channel with the +5VDC voltage source when the respective sensed voltages are substantially identical. The sensed voltages represent the average voltages at the inputs of the respective inductors. Identical inductors with substantially identical average voltages result in identical output currents.

The multiphase switching regulator establishes forced current sharing by comparing the sensed voltages to a master voltage. The sensed voltage of one channel is used as the master voltage for the other channels. Offset voltages are produced based on the differences between the respective sensed voltages and the master voltage. The respective offset voltage is added to the output of a feedback amplifier to generate a control voltage which is used to adjust the duty cycle of the PWM signal being applied to the respective switch couple the input of each inductor. The additions of the offset voltages force the sensed voltages of respective channels to track the master voltage.

The duty cycle ratios determine the output voltage level based on the level of the input voltage. The output voltage level is controlled through a feedback voltage which is proportional to the output voltage of the multiphase switching regulator. An error amplifier compares the feedback voltage to an internal reference voltage. A change in the feedback voltage indicates that a change in the total output current is desired to keep the output voltage level constant for a different load. The change is distributed evenly among the channels by changing the duty cycle ratios of all the channels in response to variations in the feedback voltage.

In another embodiment, sensed voltages are used to achieve programmable current sharing among two or more voltage sources supplied to the multiphase switching voltage regulator to drive a common output. Programmable current sharing is a concept that allows a user to configure each voltage source to deliver a different current to the output. A stronger voltage source can be configured to deliver more power than a relatively weaker voltage source.

For simplicity, a multiphase switching regulator is described that has two voltage sources coupled to two respective channels and is configured to drive a common load. The feedback voltage representative of the output voltage is provided to the feedback amplifier to control the duty cycle of the PWM circuit of the first channel to obtain the desired output voltage. The sensed voltages of both channels are provided to respective resistor divider networks. The outputs of the respective resistor divider networks are compared by a difference amplifier. The output of the difference amplifier controls the PWM circuit of the second channel, thereby controlling the duty cycle of the second channel. The resistor divider networks are substantially identical with the exception that one of the resistor divider networks has a variable resistor.

A change in the setting of the variable resistor allows the outputs of the respective resistor divider networks to present different fractional amounts of the respective sensed voltages for comparison. For example, the variable resistor is set to provide a first fraction of the first sensed voltage to the difference amplifier while the other resistor divider network is fixed to provide a second fraction of the second sensed voltage to the difference amplifier. Differences between the first fraction and the second fraction result in proportionate differences in the output currents of respective channels. Thus, the user can adjust the ratio of the current taken from two different voltage sources by changing the setting of the variable resistor. When the setting of the variable resistor is configured such that the resistor divider networks are electrically identical, the channels provide substantially identical output currents.

In yet another embodiment, the techniques for forced current sharing and programmable current sharing are combined. For brevity, the above description of the multiphase switching regulator employing programmable current sharing is expanded to illustrate the combination. The sensed voltages of the first and second channels serve as the master voltages for the third and fourth channels respectively. Offset voltages are produced from respective sensed voltage comparisons between the first and third channels and between the second and fourth channels. The offset voltage representative of the difference between the sensed voltages of the first and third channels is summed with the output of the feedback amplifier to control the PWM circuit for the third channel. The offset voltage representative of the difference between the sensed voltages of the second and fourth channels is summed with the output of the difference amplifier to control the PWM circuit for the fourth channel.

In this manner, the first and third channels (first group of channels) each provide identical output current (I1) using the forced current sharing technique. The second and fourth channels (second group of channels) each similarly provide identical output current (I2). However, the output current I1 can be different from the output current I2 by using the programmable current sharing technique.

The sensed voltages of the present invention are advantageously derived at the input of the inductors. Variations of parameters in the PWM circuits, switches, and other control circuits in the multiphase switching regulator are automatically compensated for accurate current sharing. For example, the switches are typically implemented by MOSFETs. The ON resistances of the MOSFETs can vary by 30 to 40 percent, thereby varying the voltage waveforms applied to respective inductors. The variations manifest in the sensed voltages and are compensated accordingly.

Accurate current sharing ensures that heat and component stress is evenly distributed in the power conversion circuit, thereby improving reliability. The present invention achieves accurate current sharing among multiple channels of a switching regulator without directly sensing the currents of respective channels, thereby reducing cost and power loss associated with sensing resistors typically used to sense current.

DETAILED DESCRIPTION OF THE INVENTION

Figure 1:
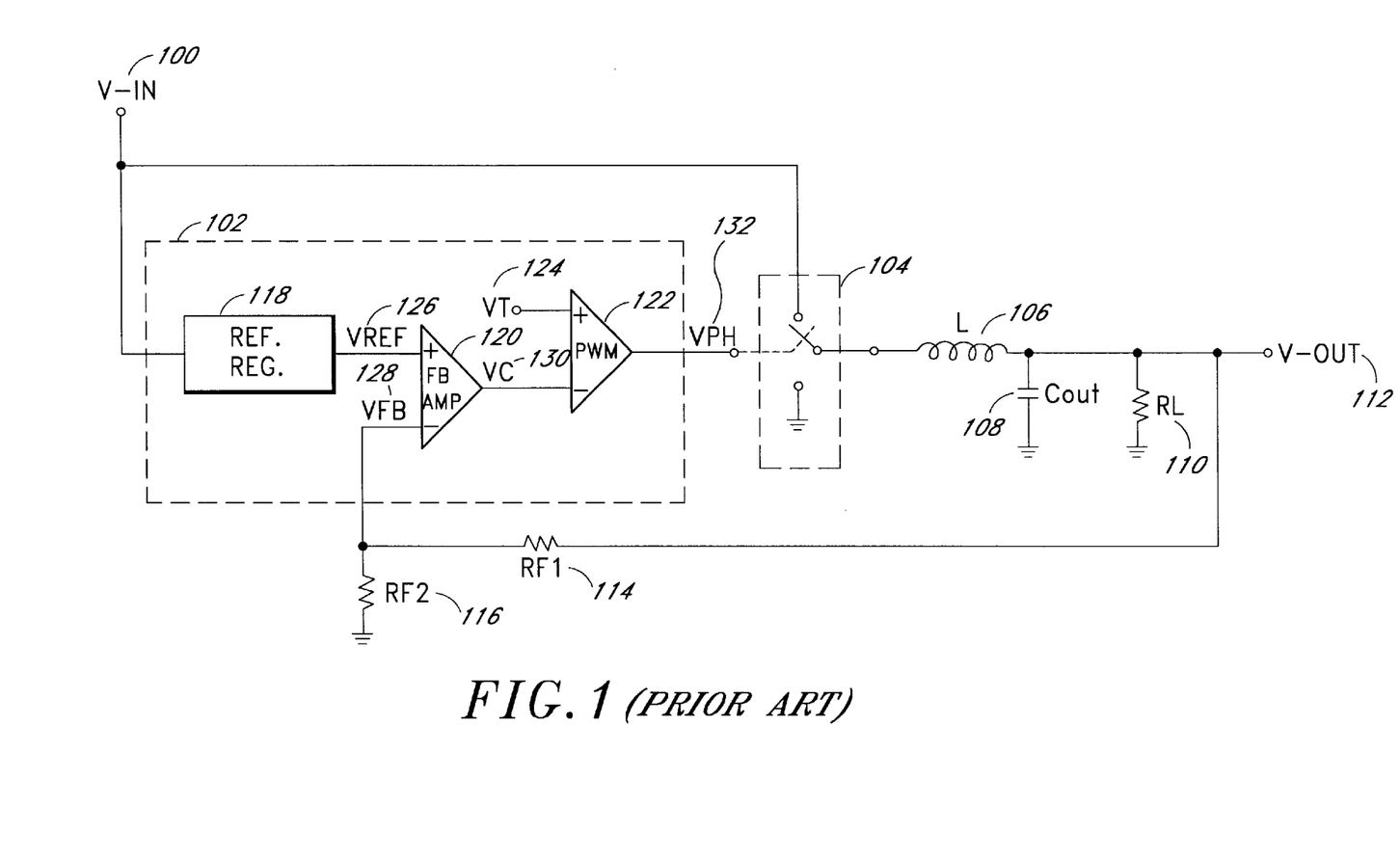
FIG. 1 is a schematic diagram of a switching regulator.

Embodiments of the present invention will be described hereinafter with reference to the drawings. FIG. 1 is a schematic diagram of a typical switching regulator. A voltage source (V-IN) 100 is provided to a controller 102 and to a switch 104 to establish an output voltage (V-OUT) 112. The controller 102 includes a reference regulator 118, a feedback amplifier 120 and a PWM circuit 122. The reference regulator 118 accepts an input from the voltage source 100 and generates a reference voltage (VREF) 126. The feedback amplifier 120 compares the reference voltage 126 with a feedback voltage (VFB) 128 and generates a control voltage (VC) 130. The PWM circuit 122 generates a rectangular wave voltage (VPH) 132 based on the control voltage 130 and a triangular wave voltage (VT) 124. The rectangular wave voltage 132 controls the operation of the switch 104 which alternately connects the input terminal of an inductor 106 to the voltage source 100 and to ground. The output terminal of the inductor 106 is coupled to the output voltage 112. An output capacitor (Cout) 108 is connected between the output voltage 112 and ground. A resistor (RL) 110, representative of an output load, is also connected between the output voltage 112 and ground. The output voltage 112 is provided to a resistor (RF1) 114 and a resistor (RF2) 116 in a resistor-divider configuration to generate the feedback voltage 128.

The switching regulator is typically used in high output current applications because of its efficient architecture. Minimal power is dissipated by the switching regulator because the output current encounters relatively lossless elements, such as the inductor 106 and the output capacitor 108 in the switching regulator. Some power is dissipated by the reference regulator 118 which provides the reference voltage 126 and powers the circuits in the switching regulator. However, the magnitude of the current required by the reference regulator 118 is typically hundreds to thousands times less than the output current so the overall efficiency is not effected.

The feedback amplifier 120 generates the control voltage 130 based on the difference between the reference voltage 126 and the feedback voltage 128. The reference voltage 126 is fixed. The feedback voltage 128 is proportional to the output voltage 112. When the output voltage 112 increases, the feedback voltage 128 increases, and the control voltage 130 consequently decreases. When the output voltage 112 decreases, the feedback voltage 128 decreases, and the control voltage 130 consequently increases.

The control voltage 130 determines the duty cycle of the rectangular wave voltage 132 at the output of the PWM circuit 122. The rectangular wave voltage 132 is generated by comparing the control voltage 130 with the triangular wave voltage 124. The rectangular wave voltage 132 switches state when the triangular wave voltage 124 crosses the control voltage 130. The triangular wave voltage 124 has a fixed amplitude and frequency. By varying the control voltage 130, the state transitions of the rectangular wave voltage 132 vary, thus varying the duty cycle of the rectangular wave voltage 132.

The rectangular wave voltage 132 controls the switch 104. for example, when the rectangular wave voltage 123 is in a high state, the switch 104 is connected to ground. When the rectangular wave voltage 123 is in a low state, the switch 104 is connected to the voltage source 100. The voltage waveform applied to the inductor 106 alternates between the voltage source 100 and ground with the same duty cycle as the rectangular wave voltage 132. The inductor 106 and the output capacitor 108 combination act a low-pass filter and provide a constant output voltage 112. The level of the output voltage 112 is the average value of the voltage waveform applied to the inductor 106. Thus, the output voltage 112 varies linearly with the duty cycle.

Figure 2:
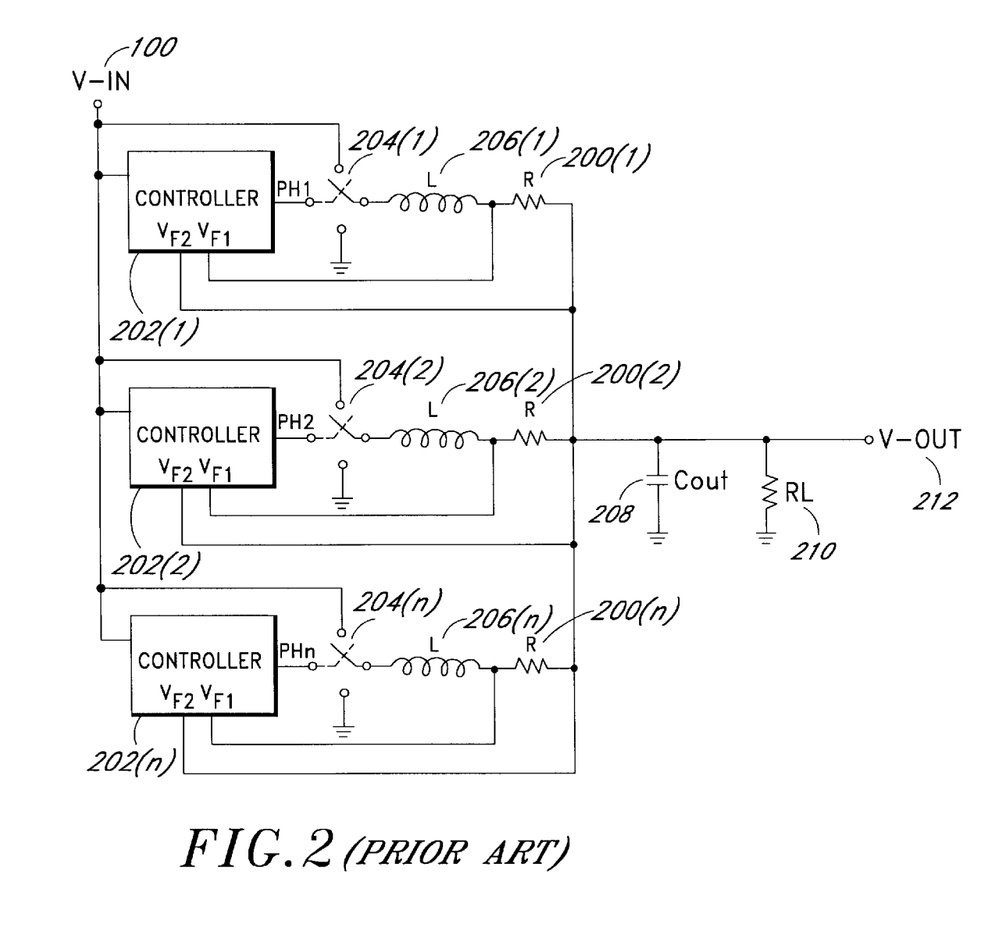
FIG. 2 is a schematic diagram of a multiphase switching regulator.

FIG. 2 is a schematic diagram of a multiphase switching regulator which uses n identical channels to process the voltage source 100 in parallel. The voltage source 100 is provided to n switches shown as switches 204(1)–204(n) (collectively the switches 204) and n controllers shown as controllers 202(1)–202(n) (collectively the controllers 202). The controllers 202 control the respective switches 204. The switches 204 alternately connect the input terminals of n respective inductors shown as inductors 206(1)–206(n) (collectively the inductors 206) between the voltage source 100 and ground. The output terminals of the respective inductors 206 are connected to the input terminals of n respective sense resistors shown as sense resistors 200(1)–200(n) (collectively the sense resistors 200). The output terminals of the sense resistors 200 are commonly connected to provide an output voltage (V-OUT) 212. An output capacitor (Cout) 208 is connected between the output voltage 212 and ground. A load resistor (RL) 210 is also connected between the output voltage 212 and ground. The voltages across the respective sense resistors 200 are fed back to the respective controllers 202.

The output current is typically divided equally among the n channels to maintain reliability by spreading the heat evenly and preventing the over-stressing of any one component. The sense resistors 200 accomplish this purpose by providing feedback of the currents in each respective channel to the respective controllers 202. Based on the feedback, the controllers 202 adjust the respective duty cycles of the rectangular wave voltage controlling the respective switches 204 to achieve forced current sharing (i.e., substantially identical output currents from respective channels).

Figure 3:
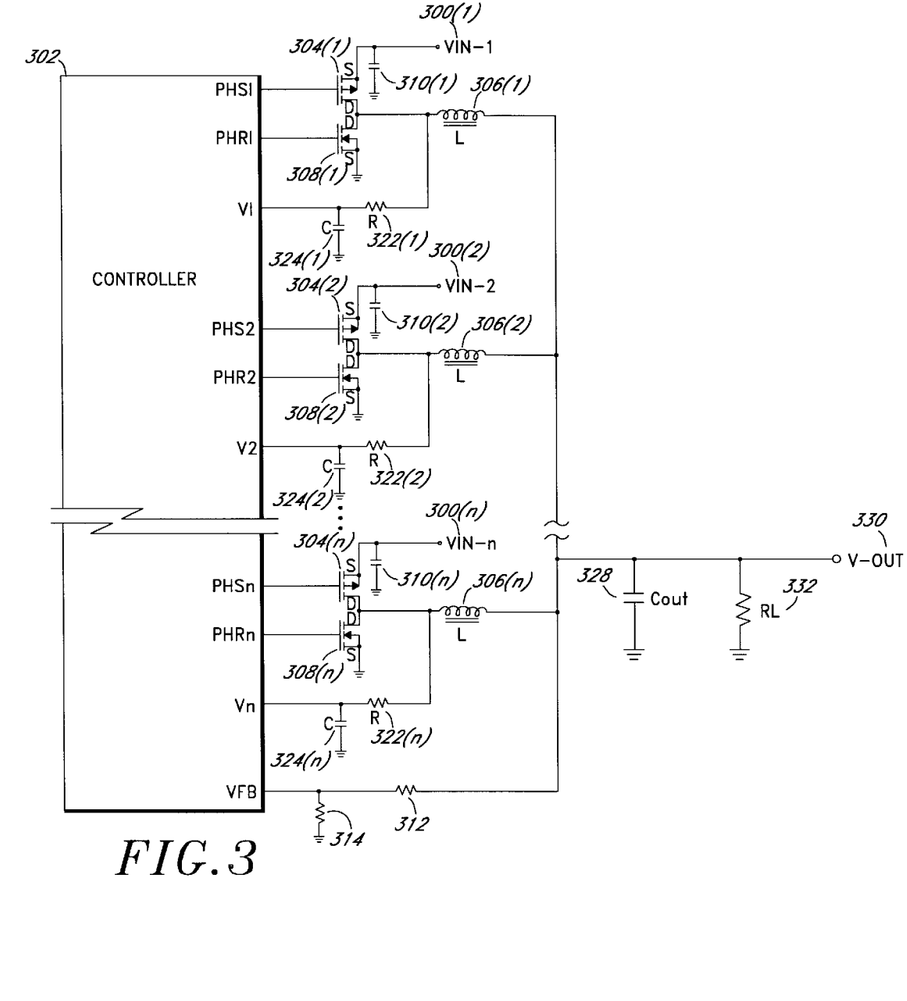
FIG. 3 is a schematic diagram of one embodiment of a multiphase switching regulator using sensed voltages to achieve accurate current sharing.

FIG. 3 is a schematic diagram of one embodiment of a multiphase switching regulator in accordance with the present invention which uses sensed voltages to achieve accurate current sharing without using current sensing resistors. The multiphase switching regulator includes n voltage sources shown as 300(1)–300(n) (collectively the voltage sources 300) that are provided to respective source terminals of n P-MOSFETs shown as P-MOSFETs 304(1)–304(n) (collectively the P-MOSFETs 304). The multiphase switching regulator also includes n input capacitors shown as input capacitors 310(1)–310(n) (collectively the input capacitors 310) that are connected between the respective voltage sources and ground. The drain terminals of the P-MOSFETs 304 are connected to the drain terminals of n respective N-MOSFETs shown as N-MOSFETs 308(1)–308(n) (collectively the N-MOSFETs 308). The source terminals of the N-MOSFETs 308 are connected to ground. The body terminals of the N-MOSFETs 308 and the P-MOSFETs 304 are connected to their respective source terminals.

The controller 302 provides n rectangular wave voltages (PHS1–PHSn) to drive the gate terminals of respective P-MOSFETs 304. The controller 302 also provides n rectangular wave voltages (PHR1–PHRn) to drive the gate terminals of respective N-MOSFETs 308. The drain terminals of the P-MOSFETs 304 and the N-MOSFETs 308 are connected to the input terminals of n respective inductors shown as 306(1)–306(n) (collectively the inductors 306). The output terminals of the inductors 306 are commonly connected to provide an output voltage 330. An output capacitor (Cout) 328 is connected between the output voltage 330 and ground. A load resistor (RL) 332 is also connected between the output voltage 330 and ground.

A feedback network coupled to the output voltage 330 provides a feedback voltage (VFB) to the controller 302. In one embodiment, the feedback network is a resistor divider network implemented by resistors 312, 314. Alternate feedback networks, such as a differential amplifier to provide differential remote voltage sensing, can also be implemented to provide the feedback voltage VFB.

The voltages at the input terminals of the respective inductors 306 are fed back to the controller 302 via n respective series resistors shown as 322(1)–322(n) (collectively the resistors 322) followed by n respective parallel capacitors shown as 324(1)–324(n) (collectively the capacitors 324) connected to ground. The resistors 322 and the capacitors 324 operate as low-pass filters.

Accurate current sharing is achieved by comparing the voltage waveforms from the input terminals of the respective inductors 306. The voltage waveforms from the input terminals of the respective inductors 306 are low-pass filtered by the respective resistors 322 and the respective capacitors 324 to provide the sensed voltages (V1–Vn) to the controller. The sensed voltages V1–Vn can be derived using other low-pass filter configurations. The sensed voltages represent the average voltages (i.e., DC) of the respective voltage waveforms applied to inductors 306. The sensed voltages are proportional to the respective voltage sources 300 and the duty cycles of the respective voltage waveforms applied to the inductors 306. Substantially identical sensed voltages result in substantially identical currents through respective inductors 306.

The P-MOSFETs 304 and the N-MOSFETs 308 function as switches that alternately connect the respective inductors 306 to the respective voltage sources 300 and ground. For example, when the gate terminals of the P-MOSFETs 304 are low, the P-MOSFETs 304 conduct and connect the input terminals of respective inductors 306 to the respective voltage sources 300. When the gate terminals of the N-MOSFETs 308 are high, the N-MOSFETs 308 conduct and connect the input terminals of respective inductors 306 to ground. The function of the P-MOSFETs 304 can be implemented by N-MOSFETs with appropriate changes to the drivers in the controller 302.

The sensed voltages V1–Vn are advantageously derived from the input terminals of the respective inductors 306. Variations, such as the ON resistance variation of the MOSFETs 304 and variations of other circuitry parameters in the controller 302, are automatically compensated.

Figure 4:
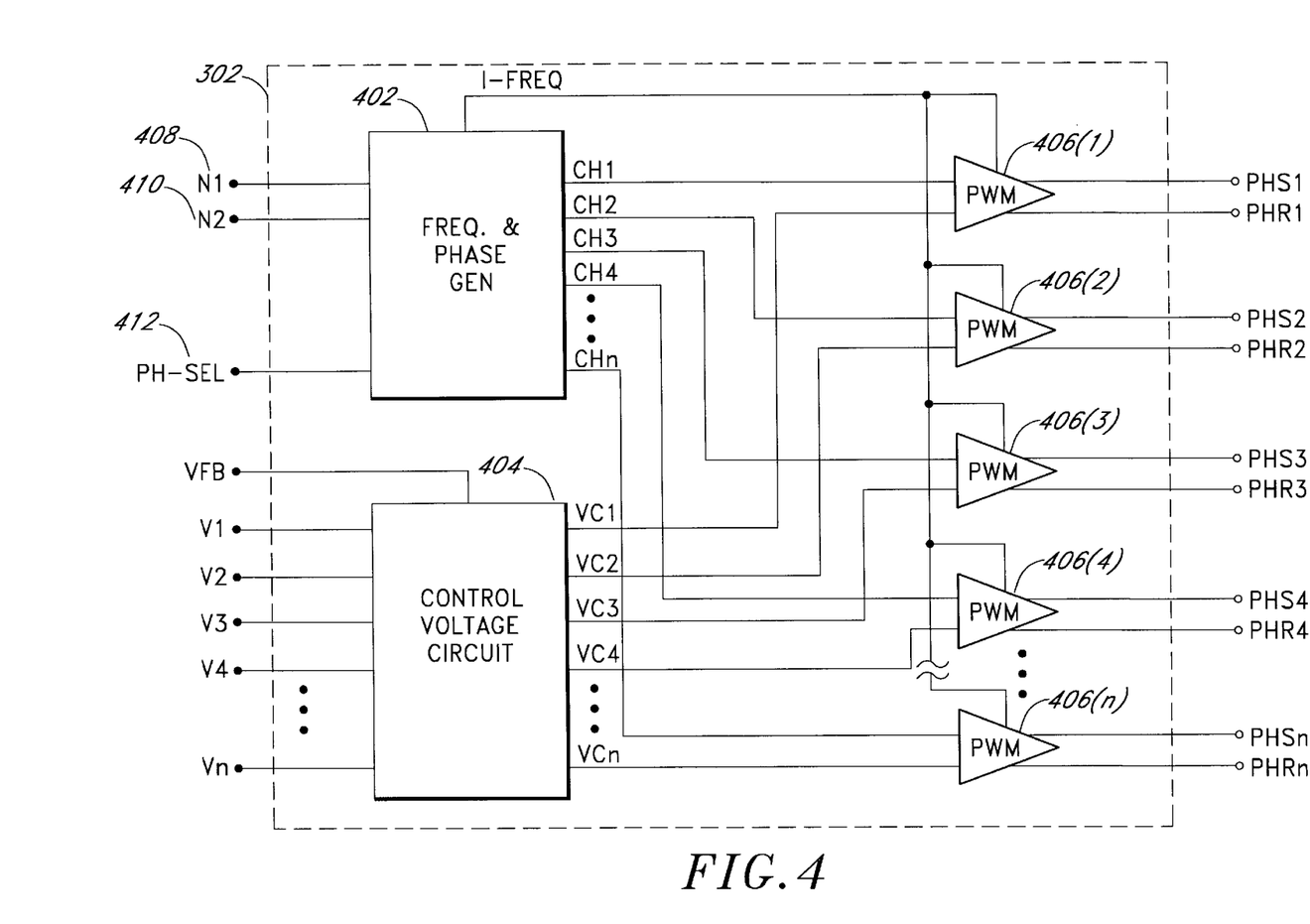
FIG. 4 is a block diagram of one embodiment of the controller shown in FIG. 3.

FIG. 4 is a block diagram of one embodiment of the controller 302 shown in FIG. 3. The controller 302 includes a frequency and multiphase generator 402, a control voltage circuit 404, and n PWM circuits shown as PWM circuits 406(1)–406(n) (collectively the PWM circuits 406).

The frequency and multiphase generator 402 generates a current (I-FREQ) indicative of an operating frequency and generates n pulses (CH1–CHn) of various phases at the operating frequency. The operating frequency is determined by external components coupled to an input node (N1) 408 and an input node (N2) 410 of the frequency and multiphase generator 402. The phases can be adjusted by applying a signal to a phase-select input 412. The current I-FREQ is provided to each of the PWM circuits 406. The n pulses CH1–CHn are provided to the respective PWM circuits 406 such that the outputs of the PWM circuits 406 also exhibit the various phases.

The control voltage circuit 404 receives the sensed voltages V1–Vn as inputs and generates n control voltages (VC1–VCn) for the respective PWM circuits 406. The PWM circuits 406 generate respective pairs of rectangular wave voltages (PHS1, PHR1 . . . PHSn, PHRn). The rectangular wave voltages of each pair (PHS, PHR) are identical with an identical phase. The phases between different pairs of rectangular wave voltages are different. The rectangular wave voltages drive the respective switches 304, 308 of the multiphase switching regulator. Each circuit block in the controller 302 is described in further detail below.

Figure 5:
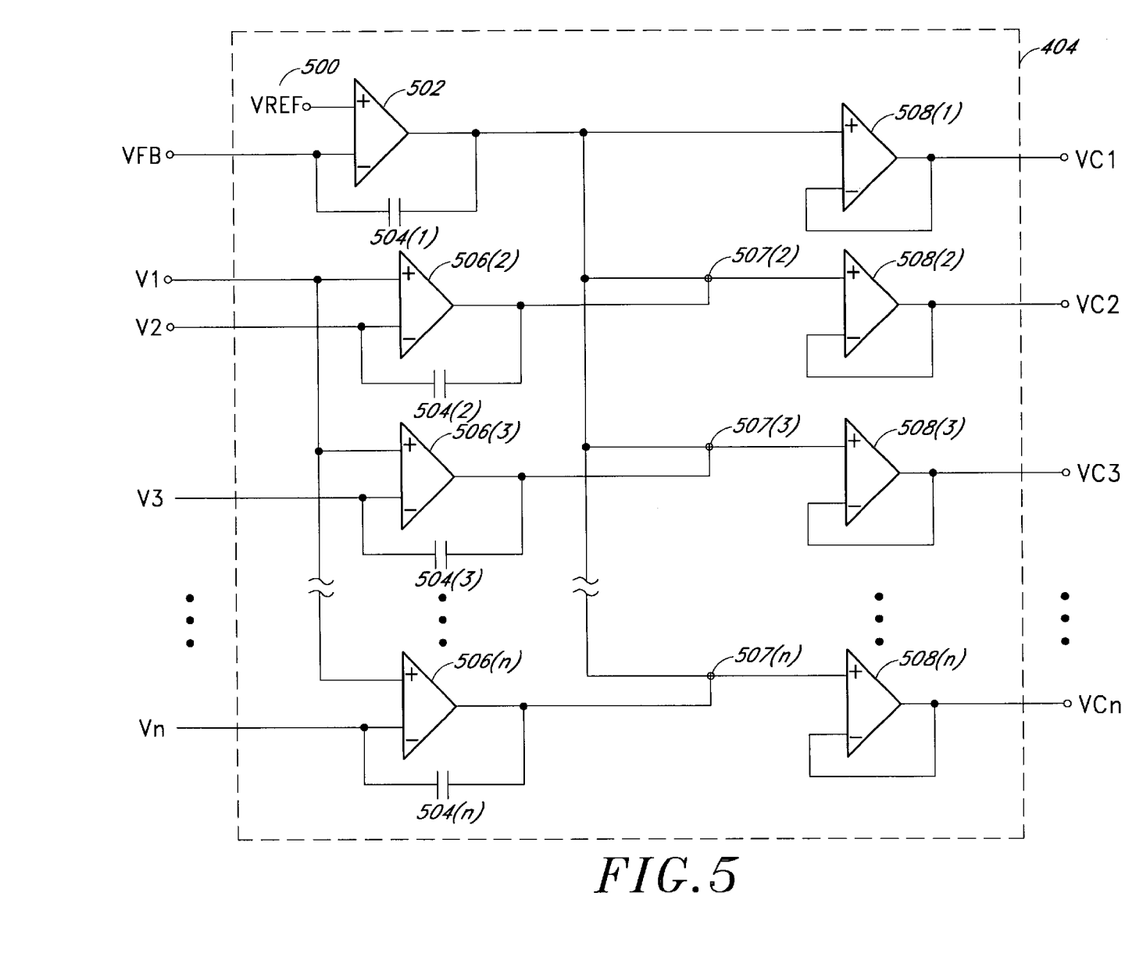
FIG. 5 is a schematic diagram of one embodiment of the control voltage circuit shown in FIG. 4.

FIG. 5 is a schematic diagram of one embodiment of the control voltage circuit 404 used for forced current sharing. The sensed voltage V1 of a master channel in the n channel multiphase regulator is provided to the non-inverting inputs of m offset amplifiers (i.e., n−1 offset amplifiers) shown as offset amplifiers 506(2)–506(n) (collectively the offset amplifiers 506). The sensed voltages V2–Vn of m slave channels are provided to the inverting inputs of the respective offset amplifiers 506. Offset voltages are generated at the respective Outputs of the offset amplifiers 506 in proportion to the difference between the master sensed voltage and the respective slave sensed voltages.

An error amplifier 502 compares the feedback voltage VFB with a reference voltage (VREF) 500. The reference voltage 500 is generated from one of the voltage sources 300 by a reference regulator (not shown). The feedback voltage VFB is proportional to the output voltage 330. The output of the error amplifier 502 is provided to the non-inverting input of a master feedback amplifier 508(1). The output of the error amplifier 502 is also summed with the outputs of the respective offset amplifiers 506 at summing nodes shown as summing nodes 507(2), 507(3) . . . 507(n) (collectively the summing nodes 507). The summing nodes 507 are advantageously implemented with resistors (not shown) or by other techniques known in the art. The sums are provided to the non-inverting inputs of m respective slave feedback amplifiers shown as 508(2)–508(n). The master feedback amplifier 508(1) and the slave feedback amplifiers 508(2)–508(n) are collectively the feedback amplifiers 508.

In one embodiment, the error amplifier 502 and the offset amplifiers 506 are configured as integrating amplifiers with n respective capacitors shown as capacitors 504(1)–504(n) (collectively the capacitors 504) coupled between the respective inverting inputs and outputs of the amplifiers 502, 506. Integrating amplifiers provide for a stable response. The feedback amplifiers 508 are configured as unity gain amplifiers with the outputs connected to the respective inverting inputs.

The outputs of the feedback amplifiers 508 are control voltages (VC1–VCn) used to adjust the duty cycles of the respective PWM circuits 406. The control voltages are derived from the additions of the respective offset voltages to the output of the error amplifier 502. The offset voltages are proportional to the differences between the sensed voltage of the master channel and the sensed voltages of the respective slave channels. The offset voltages ensure that the duty cycles of the voltage waveforms applied to the inductors 306 of the respective channels result in substantially identical sensed voltages, thereby effectuating forced current sharing. The output of the error amplifier 502 is provided to all the feedback amplifiers 508 to affect the duty cycles of the respective PWM circuits 406 similarly, thereby distributing changes in the load current evenly among the channels.

Figure 6:
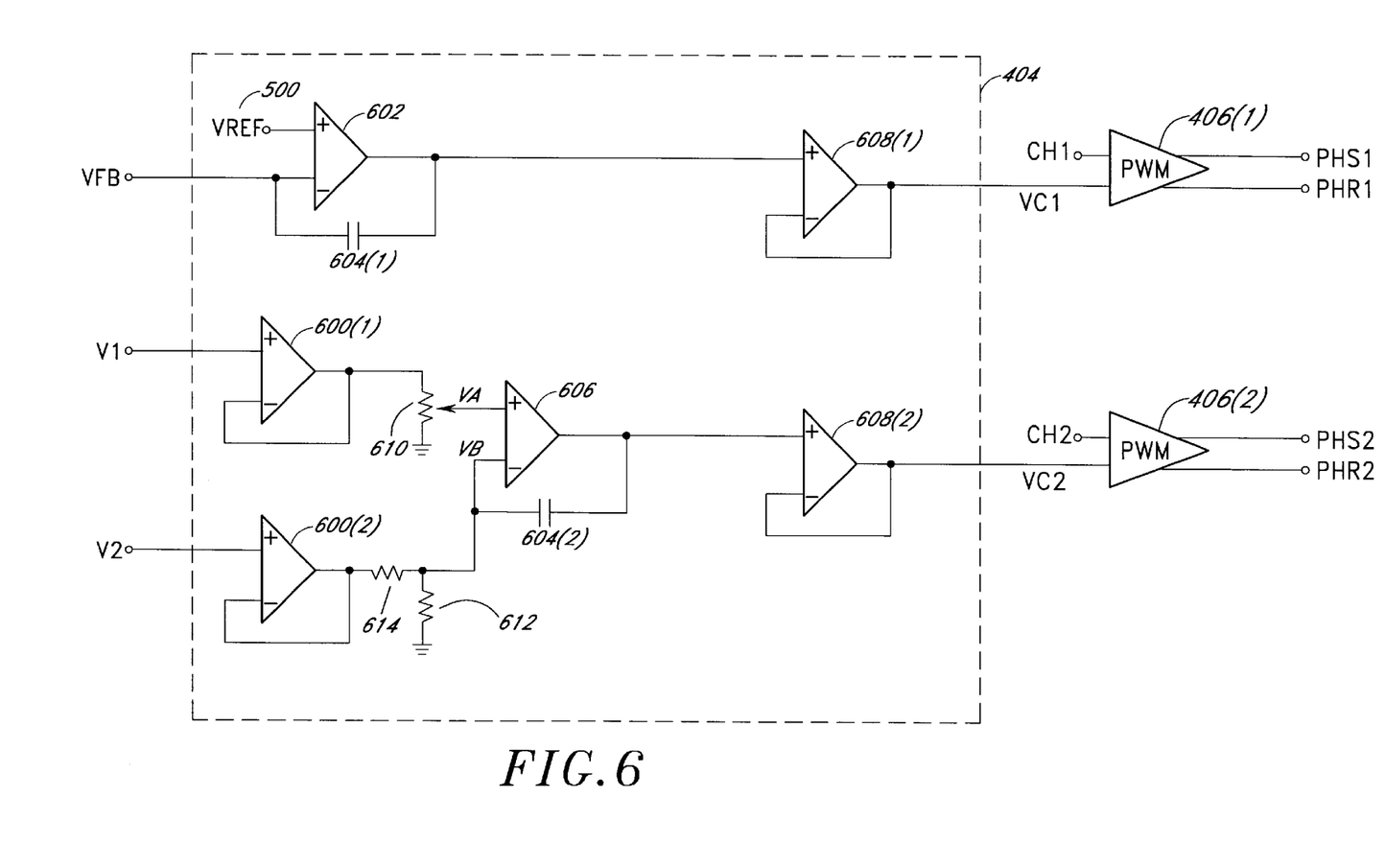
FIG. 6 is a schematic diagram of another embodiment of the control voltage circuit shown in FIG. 4.

FIG. 6 is a schematic diagram of another embodiment of the control voltage circuit 404 shown in FIG. 4. The embodiment of FIG. 6 illustrates a two-channel dual-phase switching voltage regulator employing programmable current sharing. Similar to the forced current sharing technique described above, the feedback voltage VFB is provided to an error amplifier 602 for comparison with the reference voltage 500. The output of the error amplifier 602 is provided to a feedback amplifier 608(1).

The sensed voltages V1, V2 are provided to respective buffer amplifiers 600(1), 600(2). The output of the buffer amplifier 600(1) drives a variable resistor 610 configured as a variable voltage divider network. The output of the buffer amplifier 600(2) drives a fixed resistor divider network implemented by resistors 612, 614. The variable resistor 610 generates a voltage VA that is a fraction of the sensed voltage V1. The resistors 612, 614 generate a voltage VB that is a fraction of the sensed voltage V2. A difference amplifier 606 compares the voltages VA and VB. The output of the difference amplifier 606 is provided to a feedback amplifier 608(2).

The error amplifier 602 and the difference amplifier 606 are configured as integrating amplifiers with capacitors 604(1), 604(2) coupled between respective outputs and inverting inputs. The buffer amplifiers 600(1), 600(2) and the feedback amplifiers 608(1), 608(2) are configured as unity gain amplifiers with respective outputs connected to inverting inputs.

The outputs of the respective feedback amplifiers 608(1), 608(2) are control voltages VC1, VC2 that control the duty cycles of the respective PWM circuits 406(1), 406(2). When the variable resistor 610 is adjusted to be electrically equivalent to the fixed resistor divider network, the duty cycles of the respective PWM circuits 406(1), 406(2) are controlled to cause substantially equal sensed voltages V1, V2. The output currents from respective channels are equal when their respective sensed voltages are equal.

To change the ratio of the output currents, the variable resistor 610 is adjusted to provide a different fraction of the sensed voltage V1 for comparison with a fixed fraction of the sensed voltage V2. For example, the variable resistor 610 may be adjusted so that the difference amplifier 606 compares a third of V1 with a half of V2. The difference in the fractional amounts of the sensed voltages used to generate the control voltage VC2 results in a proportionate difference in the output currents of the respective channels.

Figure 7:
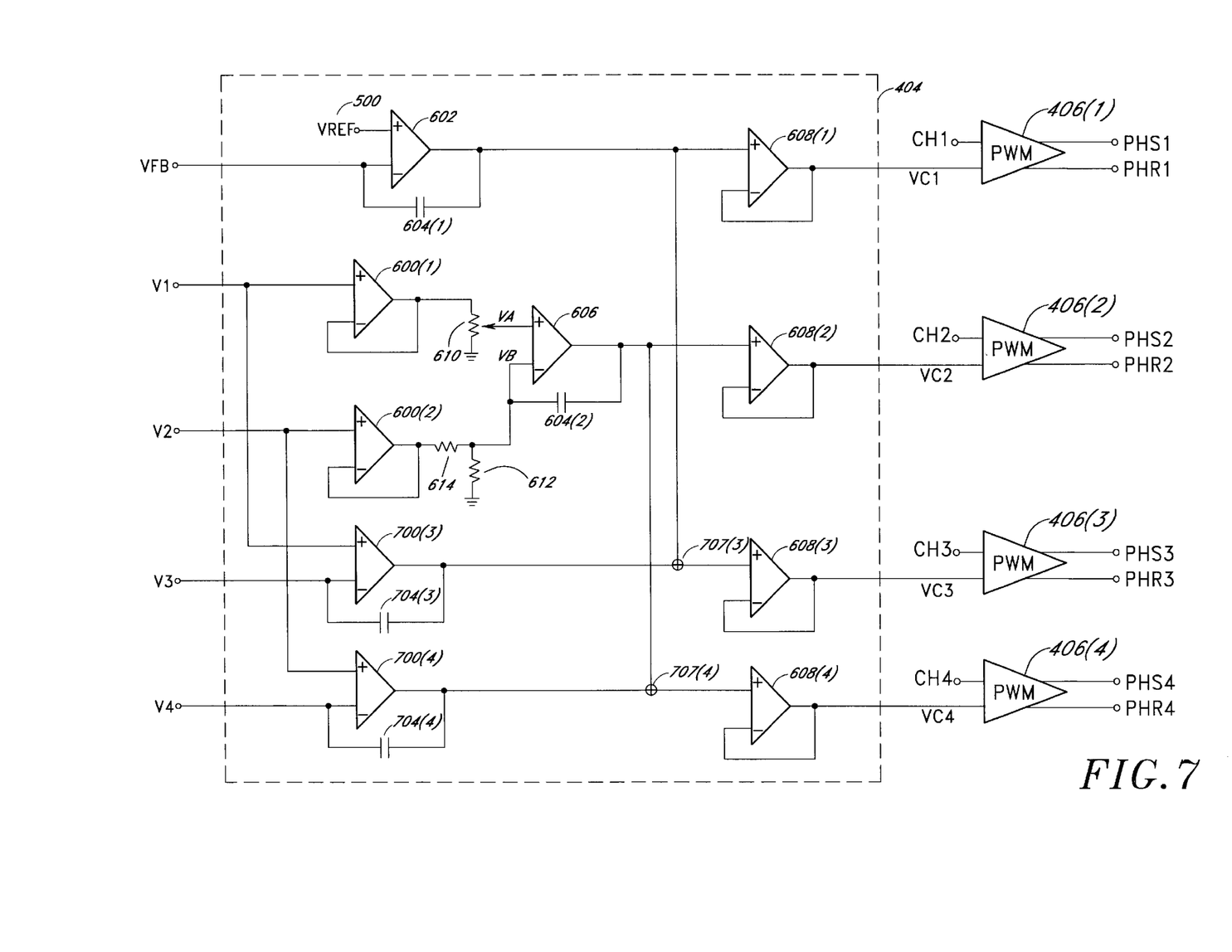
FIG. 7 is a schematic diagram of yet another embodiment of the control voltage circuit shown in FIG. 4.

FIG. 7 is a schematic diagram of yet another embodiment of the control voltage circuit 404 which illustrates the combination of forced current sharing and programmable current sharing. The present embodiment incorporates the programmable current sharing schematic described in FIG. 6 above and adds further circuit elements to implement forced current sharing.

Offset amplifiers 700(3), 700(4) are added to compare the sensed voltage V1 with the sensed voltage V3 and to compare the sensed voltage V2 with the sensed voltage V4, respectively. The output of the offset amplifier 700(3) is summed with the output from the error amplifier 602 at a summing node 707(3), and. the sum is provided to a non-inverting input of a feedback amplifier 608(3). The output of the offset amplifier 700(4) is summed with the output from the difference amplifier 606 at a summing node 707(4), and the sum is provided to a non-inverting input of a feedback amplifier 608(4).

The offset amplifiers 700(3), 700(4) are configured as integrating amplifiers with capacitors 704(3), 704(4) connected between respective outputs and inverting inputs of respective offset amplifiers 700(3), 700(4). The feedback amplifiers 608(3), 608(4) are configured as unity gain amplifiers. The outputs of the feedback amplifiers 608(3), 608(4) are control voltages VC3, VC4 that control the duty cycles of the respective PWM circuits 406(3), 406(4), thereby controlling the output currents of the respective channels.

The offset voltage from the output of the offset amplifier 700(3) adjusts the output current of the third channel to track the output current of the first channel. The offset voltage from the output of the offset amplifier 700(4) adjusts the output current of the fourth channel to track the output current of the second channel. The difference between the output currents of the first and second channels is controlled by adjusting the variable resistor 610.

Figure 8:
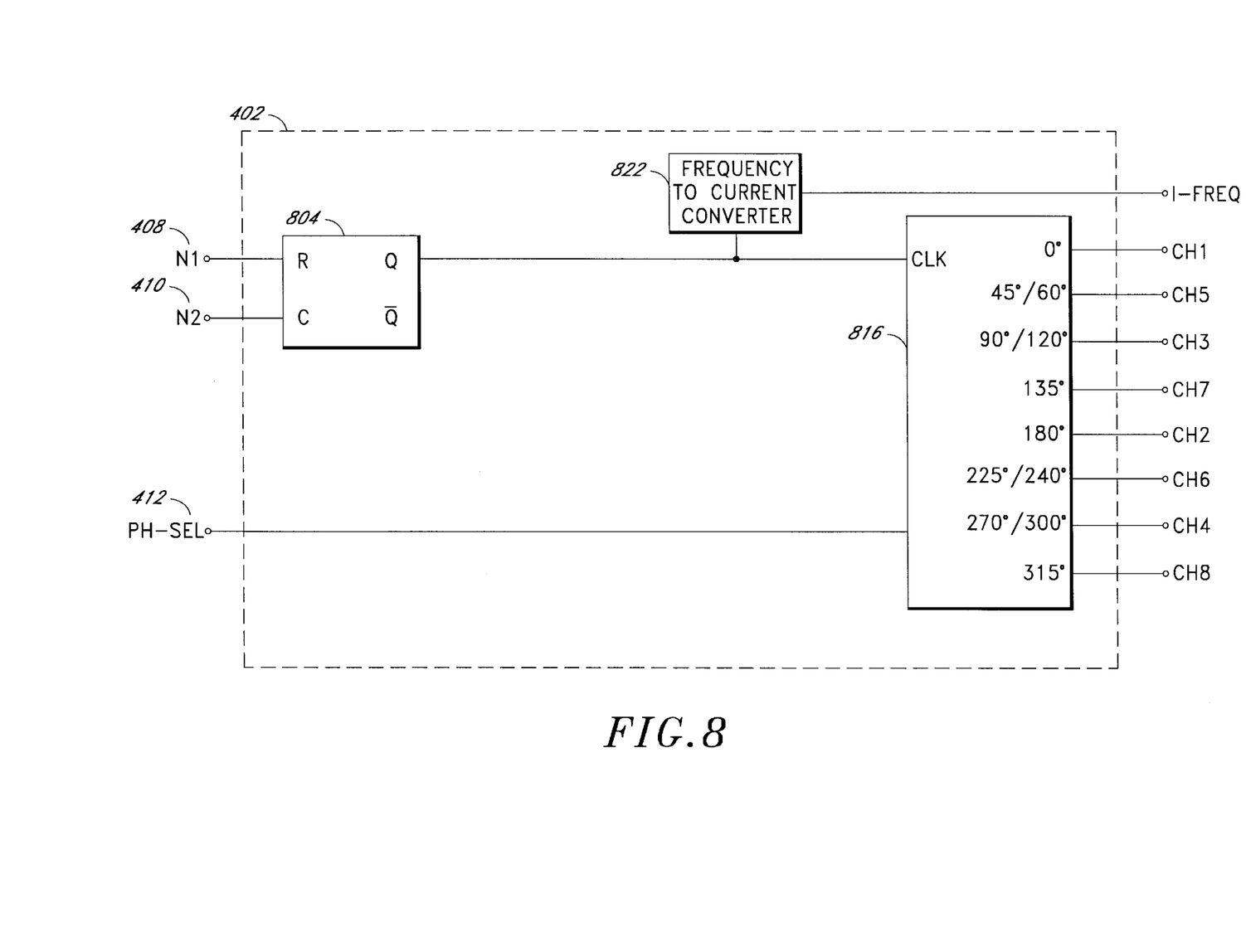
FIG. 8 is a schematic diagram of one embodiment of the frequency and multiphase generator shown in FIG. 4.

FIG. 8 is a schematic diagram of one embodiment of the frequency and multiphase generator 402 shown in FIG. 4. Resistors (not shown) and capacitors (not shown) can be connected to nodes 408 and 410 respectively to control the frequency of an oscillator 804. The output of the oscillator 804 is coupled to a frequency-to-current converter 822 and a sequencer 816. The output of the frequency-to-current converter 822 is a current (I-FREQ) that is indicative of the frequency of the oscillator 804 output. The sequencer 816 outputs n pulses with the same frequency as the oscillator 804 output. The n pulses are spaced apart by evenly spaced phase differences. In one embodiment, the sequencer 816 outputs eight pulses with the second pulse phase-shifted from the first pulse by 45 degrees, the third pulse phase-shifted from the second pulse by 45 degrees, and so on. The phase-select input 412 coupled to the sequencer 816 can change the sequencer 816 to output a different set of pulses, such as six pulses with the pulses spaced apart by 60 degrees.

Figure 9:
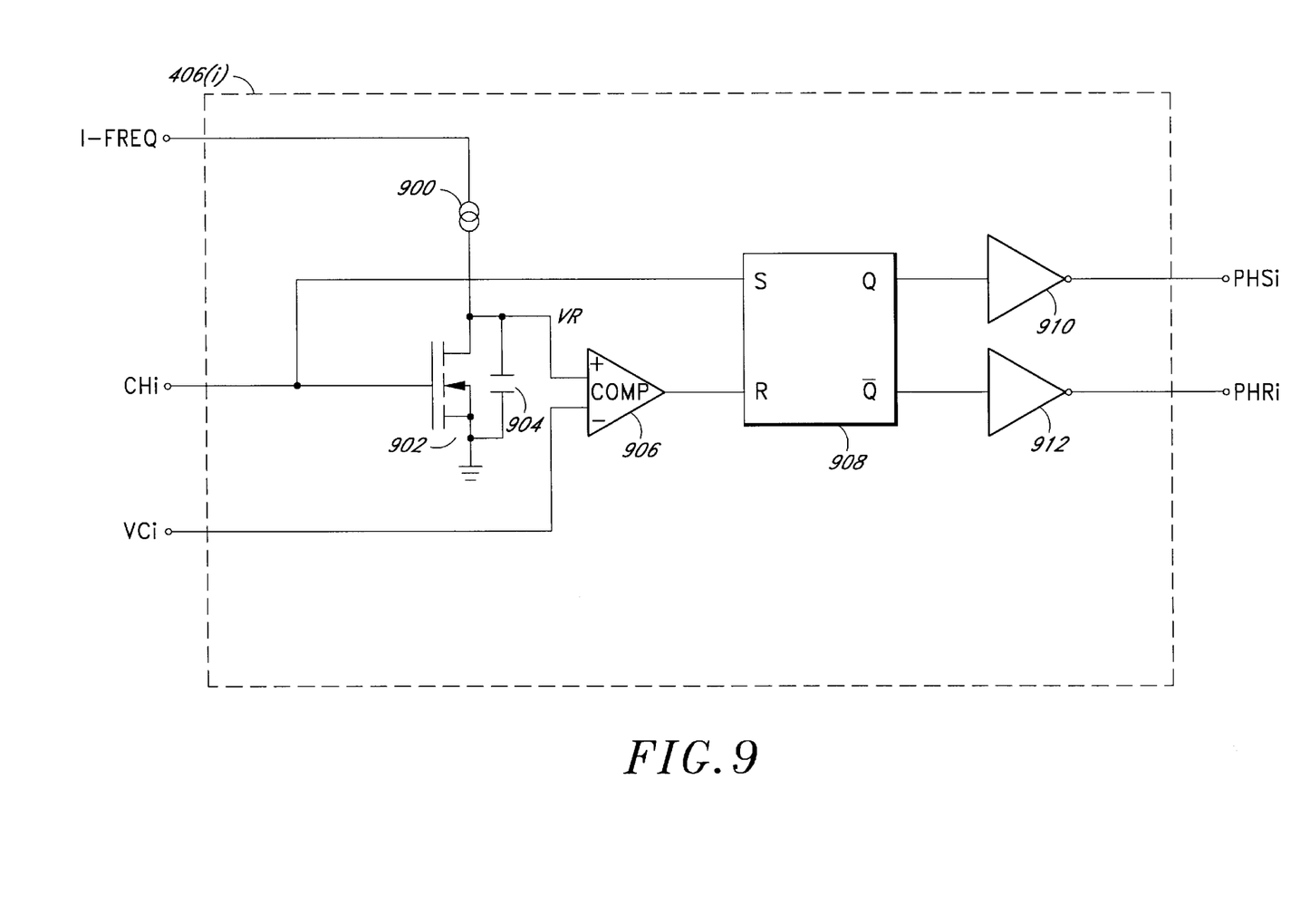
FIG. 9 is a schematic diagram of one embodiment of the PWM circuit shown in FIG. 4.

FIG. 9 is a schematic diagram of one embodiment of an exemplary one of PWM circuits 406 shown in FIG. 4 (e.g., a PWM circuit 406(i)). The current I-FREQ is coupled to a Current-Controlled-Current-Source (CCCS) 900. The CCCS 900 is coupled to a reset switch 902 and an integrating capacitor 904 connected in parallel between the CCCS 900 and ground. In one embodiment, the reset switch 902 is an N-MOSFET with a drain terminal connected to the CCCS 900 and a source terminal connected to ground. The pulse CHi from the frequency and multiphase generator 402 is coupled to a gate terminal of the N-MOSFET to control the switching operation. The pulse CHi is also coupled to a set input of a flip-flop 908. A comparator 906 compares the voltage (VR) across the integrating capacitor 904 with the control voltage VCi from the control voltage circuit 404. The output of the comparator 906 is coupled to a reset input of the flip-flop 808. Complementary outputs (Q and Q-BAR) of the flip-flop 806 are provided to respective drivers 910, 912 to produce rectangular wave voltages (PHSi and PHRi). The output Q is provided to the inverting driver 910 while the output Q-BAR is provided to the non-inverting driver 812. Thus, the rectangular wave voltages PHSi and PHRi are substantially identical. Therefore, when the respective P-MOSFET is turned on, the respective N-MOSFET is turned off, and vice-versa. The drivers 910, 912 can be modified to satisfy operational requirements of different switches.

Figure 10:
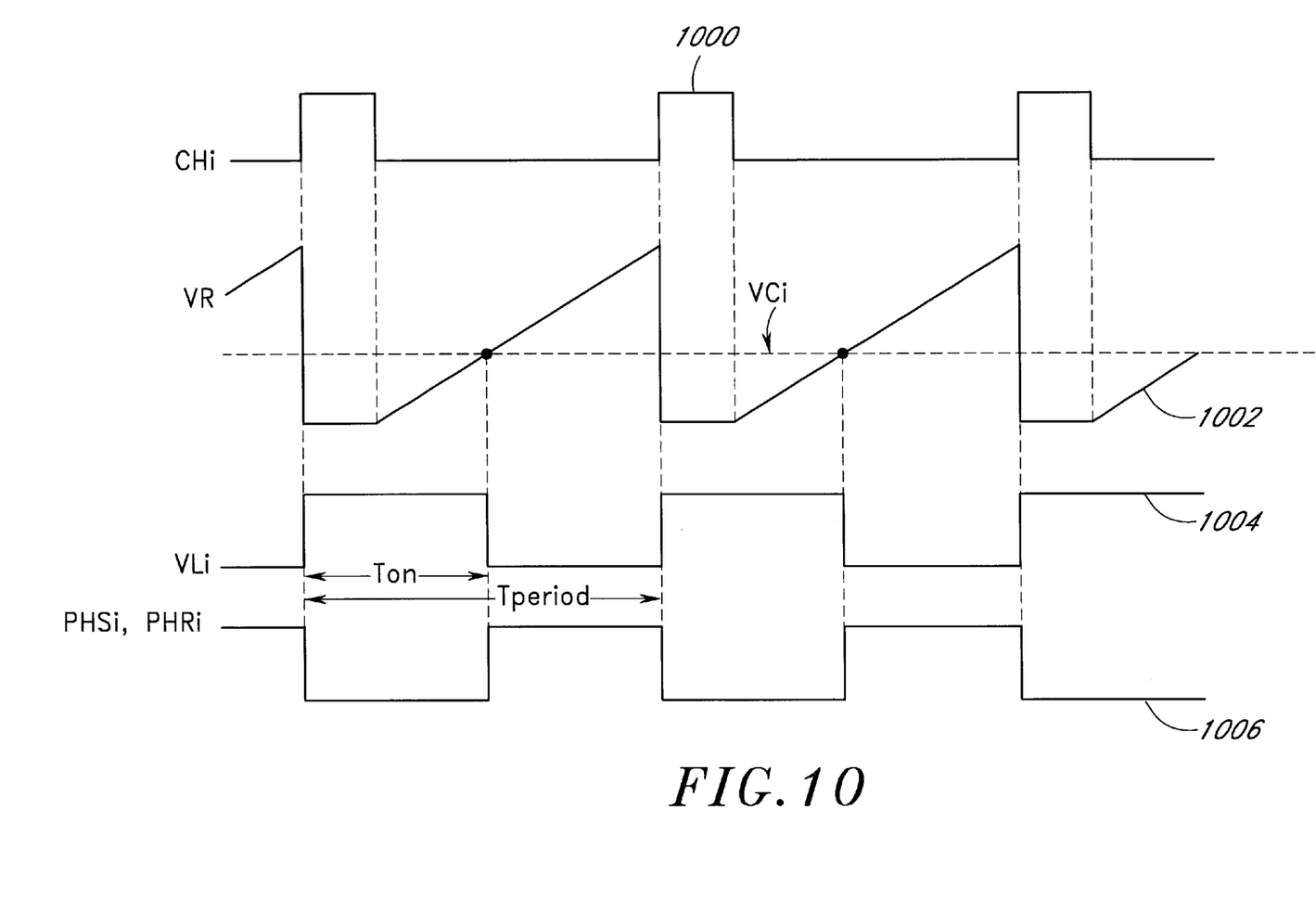
FIG. 10 illustrates waveforms of the voltages generated by the PWM circuit in the embodiment of FIG. 9.

The function of the PWM circuit 406(i) is explained in reference to voltage waveforms illustrated in FIG. 10. A graph 1000 represents the periodic pulse CHi from the frequency and multiphase generator 402 as a function of time. A graph 1002 represents the voltage VR across the integrating capacitor 904 as a function of time. A graph 1004 represents the voltage waveform VLi at the input of one of the inductors 306 (e.g., an inductor 306(i)). A graph 1006 represents the rectangular wave voltages PHSi and PHRi at the outputs of the PWM circuit 406(i).

When the periodic pulse CHi is high, the reset switch 902 conducts and shorts the voltage across the integrating capacitor 904 to ground. Thus, VR is zero during this time. When CHi is high, the Q output of the flip-flop 908 is set to high. Thus, the rectangular wave voltages PHSi and PHRi are set to low. This turns on the P-MOSFET 304(i) and turns off the N-MOSFET 308(i). Thus, the corresponding voltage waveform at the input of the inductor 306(i) is pulled up to a voltage level near the voltage source 300(i).

When CHi transitions back to low, the reset switch 902 opens and the voltage VR across the integrating capacitor 906 begins to ramp linearly because of the constant current provided by the CCCS 900. The level of the constant current varies depending on the frequency of the periodic pulse CHi and is controlled by the current I-FREQ. The variation of the constant current varies the ramp rate for different frequencies and assures that VR reaches a reasonable amplitude within a cycle regardless of the frequency. When VR is greater than the control voltage VCi, the comparator 906 provides a signal to reset the flip-flop 908. The rectangular wave voltages PHSi and PHRi are high for the rest of the period after the reset. This turns off the P-MOSFET 304(i) and turns on the N-MOSFET 308(i) to cause the corresponding voltage waveform at the input terminal of the inductor 306(i) to be forced near ground. The characteristics of VR are fixed for a particular frequency. A change in the control voltage VCi results in a proportionate change in the duty cycles of the rectangular wave voltages, thereby changing the output currents of respective channels. The duty cycle is the ratio of the time (Ton) the inductor 306(i) is coupled to the voltage source 300(i) in one period to the time (Tperiod) of one period.

Although described above in connection with particular embodiments of the present invention, it should be understood that the descriptions of the embodiments are illustrative of the invention and are not intended to be limiting. Various modifications and applications may occur to those skilled in the art without departing from the true spirit and scope of the invention.

What is claimed is:

1. A multiphase switching regulator with forced current sharing comprising:
   at least a first inductor and a second inductor having respective input terminals and respective output terminals, said output terminals connected together;
   at least a first switch circuit connected to said input terminal of said first inductor and a second switch circuit coupled to said input terminal of said second inductor;
   at least one voltage source coupled to said first and second switch circuits; and
   a controller to control operations of said first and second switch circuits to alternately connect said input terminals of the respective inductors to said respective voltage source and ground, and wherein said controller adjusts duty cycles of respective voltage waveforms across the respective inductors to achieve equal sensed voltages representative of respective voltages at the input terminals of the inductors.

2. The multiphase switching regulator with forced current sharing of claim 1 wherein said voltages at the respective input terminals are low-pass filtered to produce said respective sensed voltages.

3. The multiphase switching regulator with forced current sharing of claim 1 wherein said switch circuits are implemented by Metal-Oxide-Semiconductor-Field-Effect-Transistors.

4. The multiphase switching regulator with forced current sharing of claim 1 wherein:
   said controller comprises a control voltage circuit and at least two pulse-width modulation circuits; and
   said control voltage circuit produces control voltages to control duty cycles of respective outputs of the respective pulse-width modulation circuits.

5. A multiphase switching regulator with forced current sharing comprising:
   at least a first inductor and a second inductor having respective input terminals and respective output terminals, said output terminals connected together;
   at least a first switch circuit connected to said input terminal of said first inductor and a second switch circuit coupled to said input terminal of said second inductor;
   at least one voltage source coupled to said first and second switch circuits;
   a controller to control operations of said first and second switch circuits to alternately connect said input terminals of the respective inductors to said respective voltage source and ground, and wherein said controller adjusts duty cycles of respective voltage waveforms across the respective inductors to achieve equal sensed voltages representative of respective voltages at the input terminals of the inductors;
   said controller comprises a control voltage circuit and at least two pulse-width modulation circuits;
   said control voltage circuit produces control voltages to control duty cycles of respective outputs of the respective pulse-width modulation circuits; and
   said control voltage circuit further comprises:
      an error amplifier configured to compare a feedback voltage proportional to an output voltage with a reference voltage;
      a first feedback amplifier configured to buffer output of said error amplifier and provide a first control voltage;
      an offset amplifier configured to compare a first sensed voltage with a second sensed voltage; and
      a second feedback amplifier configured to sum an output of said offset amplifier with an output of said error amplifier and provide a second control voltage.

6. The multiphase switching regulator with forced current sharing of claim 5 wherein:
   said error amplifier and said offset amplifier are integrating amplifiers; and
   said feedback amplifiers are unity gain amplifiers.

7. A method of forced current sharing in a multiphase switching regulator comprising the acts of:
   converting voltages at respective input terminals of inductors into sensed voltages, wherein said sensed voltages are proportional to respective duty cycles of respective voltage waveforms across said respective inductors, one of said sensed voltages being a master sensed voltage and the others of said sensed voltages being slave sensed voltages;

comparing said slave sensed voltages to said master sensed voltage;

generating respective offset voltages based on respective differences between each of said slave sensed voltages and said master sensed voltage; and adjusting duty cycles of said voltage waveforms in accordance with respective offset voltages to achieve equal sensed voltages.

8. A multiphase switching regulator with forced current sharing comprising:

means for converting voltage waveforms at respective input terminals of respective inductors into respective sensed voltages;

means for comparing said sensed voltages; and means for adjusting duty cycles of said respective voltage waveforms to achieve equal sensed voltages.

* * * * *